(12) United States Patent
Murhed et al.

(10) Patent No.: US 12,436,110 B2
(45) Date of Patent: Oct. 7, 2025

(54) INSPECTION OF DRINKING STRAW (71) Applicant: SICK IVP AB, Linköping (SE)

(72) Inventors: Anders Murhed, Linköping (SE); Mathilda Larsson, Linköping (SE); Nils Högberg, Linköping (SE)

(73) Assignee: Sick IVP AB, Linkoping (SE)

( * ) Notice: Subject to any disclaimer, the term of this patent is extended or adjusted under 35 U.S.C. 154(b) by 113 days.

(21) Appl. No.: 18/066,523

(22) Filed: Dec. 15, 2022

(65) Prior Publication Data
US 2023/0228693 A1   Jul. 20, 2023

(30) Foreign Application Priority Data
Jan. 14, 2022  (EP) ..................................... 22151640

(51) Int. Cl.
*G01N 21/952* (2006.01)
*G01N 21/88* (2006.01)

(52) U.S. Cl.
CPC ....... *G01N 21/952* (2013.01); *G01N 21/8806* (2013.01); *G01N 2021/8887* (2013.01)

(58) Field of Classification Search
CPC ............ G01N 21/952; G01N 21/8806; G01N 2021/8887; G01N 21/95; G01N 21/954; G01N 2021/8835
See application file for complete search history.

(56) References Cited

U.S. PATENT DOCUMENTS 5,355,213 A * 10/1994 Dotan .................. G01N 21/958
                                                         356/239.8
2023/0145726 A1   5/2023 Salomäki

FOREIGN PATENT DOCUMENTS

| CN | 210417937    | 4/2020  |
| JP | 32-006600 B  | 8/1957  |
| JP | 2001-001401 A| 1/2001  |
| JP | 2004-151069  | 5/2004  |
| JP | 2007-114187 A| 5/2007  |
| JP | 2017-181126 A| 10/2017 |

(Continued)

*Primary Examiner* — Jonathan M Hansen
(74) *Attorney, Agent, or Firm* — DUANE MORRIS LLP; Gregory M. Lefkowitz (57) ABSTRACT

Method and arrangements for inspection of a drinking straw (101; 201) involving use of the drinking straw (101; 201) as a light guide for inspection of a sidewall (102; 202) of the drinking straw (101; 201) based on light leakage of guided light out from the drinking straw (101; 201) via the sidewall (102), such a through a damage (204) in the sidewall (102). It is illuminated (601), by means of one or more light sources (123), a first portion (131) of the drinking straw (101; 201) so that at least some of the light (127) on the first portion (131) is transmitted through a sidewall (102; 202) of the drinking straw (101; 201) into the drinking straw (101), and is guided therein. It is provided (602) one or more digital images (241) imaging another, second, portion (133; 233) of the drinking straw (101; 201) during said illumination. A light pattern captured by said one or more digital images (241) is analysed (603), corresponding to light escape of the internally reflected light out from the second portion (133) of the drinking straw (101; 201) via a sidewall (102; 202) of the drinking straw (101; 201). The damage (204) may be detected as a local spot (243) of image data discrepancy.

14 Claims, 8 Drawing Sheets

(56) References Cited

FOREIGN PATENT DOCUMENTS

| | | |
|---|---|---|
| JP | 2018-157448 | 10/2018 |
| JP | 2021-029312 A | 3/2021 |
| JP | 2023-003992 A | 1/2023 |

\* cited by examiner

INSPECTION OF DRINKING STRAW

CROSS-REFERENCE TO RELATED APPLICATIONS

This application claims priority to European Patent Application No. 22151640.4, filed on Jan. 14, 2022, the entire contents of which are incorporated herein by reference.

TECHNICAL FIELD

Embodiments herein concern a method and arrangements for inspection of a drinking straw by means of one or more images of the drinking straw.

BACKGROUND

Drinking straws need to be inspected before use, typically during manufacturing, to secure the function for the consumer, e.g. to ensure a sufficient and/or required quality and that there are no damages, such as holes, in the sidewalls of the drinking straw.

Some drinking straws are inside a wrapping for attachment to and for distribution with a dispenser that the drinking straw is to be used with.

Drinking straws in plastic as well as plastic wrappings, e.g. of transparent plastic foil, have been predominant hitherto.

A way of inspecting a drinking straw outside of the wrapping is by imaging it and using imaging analysis to e.g. check for damages, in particular at parts that are more prone for damages. For example, some drinking straws has a curved drinking end and are bent when inserted in the wrapping, and for such drinking straws the curved part is a portion that may be more prone for damages than other portions of the drinking straw. When the wrapping is transparent the drinking straw is visible inside it and can be inspected while located inside the wrapping.

SUMMARY

In view of the above, an object is to provide one or more improvements or alternatives to the prior art.

According to a first aspect of embodiments herein, the object is achieved by a method for inspection of a drinking straw. It is illuminated, by means of one or more light sources, a first portion of the drinking straw so that at least some of the light on the first portion is transmitted through a sidewall of the drinking straw into the drinking straw and is guided therein by internal reflections. It is provided, by means of a camera with image sensor configured to sense light provided by said light sources, one or more digital images imaging another, second, portion of the drinking straw during said illumination. It is then analyzed a light pattern captured by said one or more digital images, said light pattern corresponding to light escape of the internally reflected light out from the second portion of the drinking straw via a sidewall of the drinking straw.

According to a second aspect of embodiments herein, the object is achieved by a computer program comprising instructions that when executed by one or more processors causes one or more devices to perform the method according to the first aspect.

According to a third aspect of embodiments herein, the object is achieved by a carrier comprising the computer program according to the second aspect.

According to a fourth aspect of embodiments herein, the object is achieved by a use of a drinking straw as a light guide for inspection of a sidewall of the drinking straw based on light leakage of guided light out from the drinking straw via the sidewall.

According to a fifth aspect of embodiments herein, the object is achieved by one or more devices for inspection of a drinking straw. The one or more devices are configured to illuminate, by means of one or more light sources, a first portion of the drinking straw so that at least some of the light on the first portion is transmitted through a sidewall of the drinking straw into the drinking straw and is guided therein by internal reflections. The one or more devices are further configured to, by means of a camera with image sensor configured to sense light provided by said light sources, provide one or more digital images imaging another, second, portion of the drinking straw during said illumination. Moreover, the one or more devices are configured to analyze a light pattern captured by said one or more digital images, said light pattern corresponding to light escape of the internally reflected light out from the second portion of the drinking straw via a sidewall of the drinking straw.

Thanks to embodiments herein it is facilitated, or even enabled, image analyzing based inspection of drinking straws and drinking straws in wrappings, even when the drinking straw and/or wrapping under normal light conditions and/or general illumination is not transparent, but translucent or opaque. This is typically the case if the drinking straw and/or wrapping is of paper, or paper based or paper like material, such as when the wrapped drinking straw is inside a wrapping of paper foil. Embodiments herein thus facilitate inspection of drinking straws and/or wrapped drinking straws based on paper or paper like material.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Plastic drinking straws and plastic wrappings. e.g. of plastic foil, as mentioned in the Background are, or are expected to soon be, prohibited. It is expected that the wrapping instead will be based on paper or paper like material, such as made of paper foil or similar, which is not transparent as typically is the case with plastic foils, and typically not even translucent under conventional light conditions and general illumination of the drinking straw, but instead opaque. This means that conventional imaging of the of drinking straw when the drinking straw is inside the wrapping, as mentioned in the Background, can no longer be used to inspect the drinking straw. since the image, at best will only provide a blurry image of the drinking straw. Hence, it has been identified a need for a new way of inspecting wrapped drinking straws and that can work also when the straw is inside a non-transparent wrapping, e.g. a translucent or opaque wrapping. Inspection may even be more important than in the past since a drinking straw that is of non-plastic material may be more difficult to produce with good quality than one in plastic, and there may thus be a greater risk of damaged drinking straws that need to be identified.

FIGS. 1A-D schematically illustrates an example of a drinking straw 101 and a wrapped drinking straw 109, that can be used with embodiments herein.

Figures 1A, 1B, 1C:
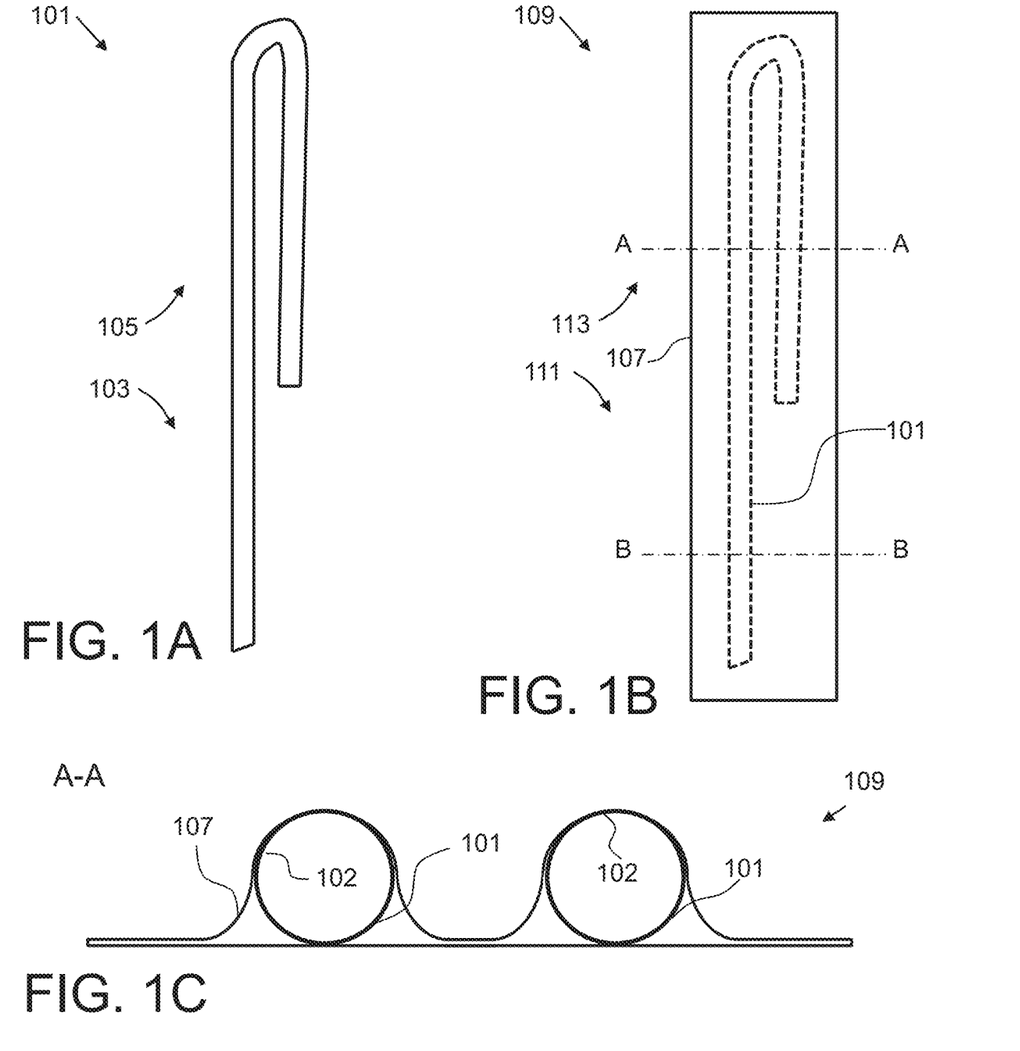
FIGS. 1A-D schematically illustrates an example of a drinking straw and a wrapped drinking straw that can be used with embodiments herein.

FIG. 1A shows the drinking straw 101 that has an insertion end portion 103 with an end for insertion into a dispenser (now shown) and a curved drinking end portion 105 with an end to drink from.

FIG. 1B shows the wrapped drinking straw 109, corresponding to the drinking straw 101 in a wrapping 107, e.g. of paper as mentioned above. An insertion end portion 111 of the wrapped drinking straw 109 comprises the insertion end portion 103 of the drinking straw 101. A drinking end portion 113 of the wrapped drinking straw 109 comprises the curved drinking end portion 105 of the drinking straw 101.

FIG. 1C shows first cross-section of the wrapped drinking straw 109. The cross section is at location A-A marked in FIG. 1B. The drinking straw 101 can be seen located inside the wrapping 107. The drinking straw 101 has a sidewall 102 indicated in the figure. The sidewall, or sidewalls in the unusual case of con-circular or non-elliptical drinking straws, is/are conventionally thin as can also be seen in the figure. In practice it's typically, for cost and environmental reasons, of interest to make a drinking straw with as thin sidewalls as this is possible and suitable. However, this increase the risk that problematic sidewall damages occur, such as holes, and is a reason why sidewall inspection of drinking straws is of interest to perform, in particular of some portion or part that may be more prone to be damaged during production, or that risk to be produced with undesired variations.

Figure 1D:
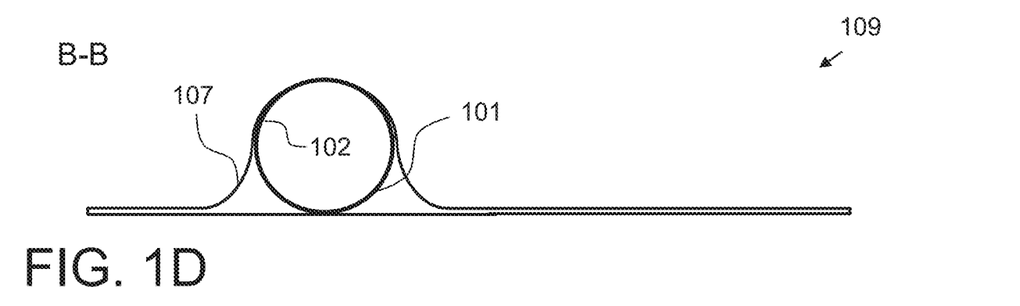

FIG. 1D shows second cross-section of the wrapped drinking straw 109. The cross section is at location B-B marked in FIG. 1B.

The curved part of the drinking end portion 105 may be formed by bending of a straight drinking straw that, at a portion where it shall be bent, has been manufactured with corrugations that enable and/or facilitate bending, or according to any other conventional method. The bending may be performed before or in connection with insertion in the wrapping 107, i.e. such drinking straw with corrugations may be inserted so it is bent by the insertion and/or kept in bent position by the wrapping 107 when it is inside the wrapping. In such situation it may be of particular interest to be able to inspect the curved part of the drinking straw 101 when the drinking straw is inside the wrapping 107, to identify if the bending as such has resulted in damages.

Note that the drinking straw 101 and the wrapped drinking straw 109 are just examples. Other formed and/or shaped drinking straws can be used with embodiments herein as well, for example straight drinking straws, drinking straws that are curved or bent with other dimensions, relations and/or proportions than shown in FIGS. 1A-D.

Embodiments herein are at least partly based on the idea of using the drinking straw to be inspected, e.g. the drinking straw 101, as such, as a light guide to inspect a sidewall, e.g. the sidewall 102, of the drinking straw 101 based on light leakage of guided light out from the drinking straw 101 via the sidewall 102. It has been found that by targeting and/or directing illumination from the outside on, such as specifically on, a first portion of the sidewall, sufficient amount of diffuse light can be made to enter the drinking straw and be guided therein through internal reflections in the sidewalls so that in case of a hole, or other damage, or other structure, at another portion, this will cause light escape or change in light escape through the sidewall via the hole, or damage, or structure, at the second portion of the sidewall, with enough light being leaked out so it can be sensed by a camera and image sensor. One or more digital images capturing a light pattern of the escaped light may thereby be provided. Presence of such light pattern and/or change in the light pattern compared to a reference, and/or even the location of light escape, can be identified though analysis of the digital image(s).

The principle works also in the case of a wrapped drinking straw, such as the wrapped drinking straw 109. That is, illumination can be provided so that light is transmitted through both the wrapping 107 and a sidewall 102 of the drinking straw 101, into the drinking straw 101, so that it is guided therein by internal reflections.

The skilled person realizes that there are practical limitation for application, but even in the case of opaque drinking straws and/or wrapping, e.g. of paper like or paper based material, sufficient light can be made to enter the drinking straw by means of e.g. one or more light emitting diodes (LEDs), as the light source(s) providing the illumination, preferably in close connection to the drinking straw or the wrapped drinking straw. Alternatively sufficiently intense light can be directed and/or guided to the first portion, i.e. portion to be illuminated, to accomplish sufficiently intense light for transmission through the wrapping when such is present and the sidewall of the drinking straw, into the inside of the drinking straw.

When being aware of the general principle behind embodiments herein, the skilled person will have no problem to, in a specific case with a certain drinking straw and/or wrapped drinking straw, be able to, through conventional knowledge, routine experimentation and testing, accomplish a working solution based on embodiments and information provided herein, or come to conclusion that the specific drinking straw and/or wrapping is/are unsuitable to be used with embodiments herein.

As long as some light can be made to enter, i.e. there is light transmission, through a sidewall portion of the drinking straw, and any wrapping in the way and covering this portion, the light that enters will enter as more or less diffuse light, especially when the drinking straw and/or wrapping is/are opaque or translucent. The light that enters the inside will typically be more diffuse than directly from the light source(s). Light sources that as such provide diffuse light, such as conventional LEDs, may advantageously be used and may be preferred in case of application to transparent drinking straws and wrappings if present, to make more light enter via the sidewall at angles that results in internal reflections. In any case, some of the diffuse light that enters through the sidewall will be reflected and guided by internal reflections inside the drinking straw if the material and inside of the drinking straw allow for this. Reflection of light inside a drinking straw is generally the case with all practical drinking straws. If not, e.g. if the drinking straw is of a material and/or has an inside surface that prevents sufficient internal reflections of light, the skilled person will have no problem of identifying this and will consequently not expect embodiments herein to be compatible with such drinking straw.

Examples of drinking straws and wrappings that the skilled person will not expect to be compatible with embodiments herein are such with continuous metallic surface or layer in the drinking straw and/or wrapping, or in case of a very thick opaque drinking straw and/or wrapping. However, as indicated above, such drinking straws and wrappings are typically of no or little commercial interest.

Figure 2A:
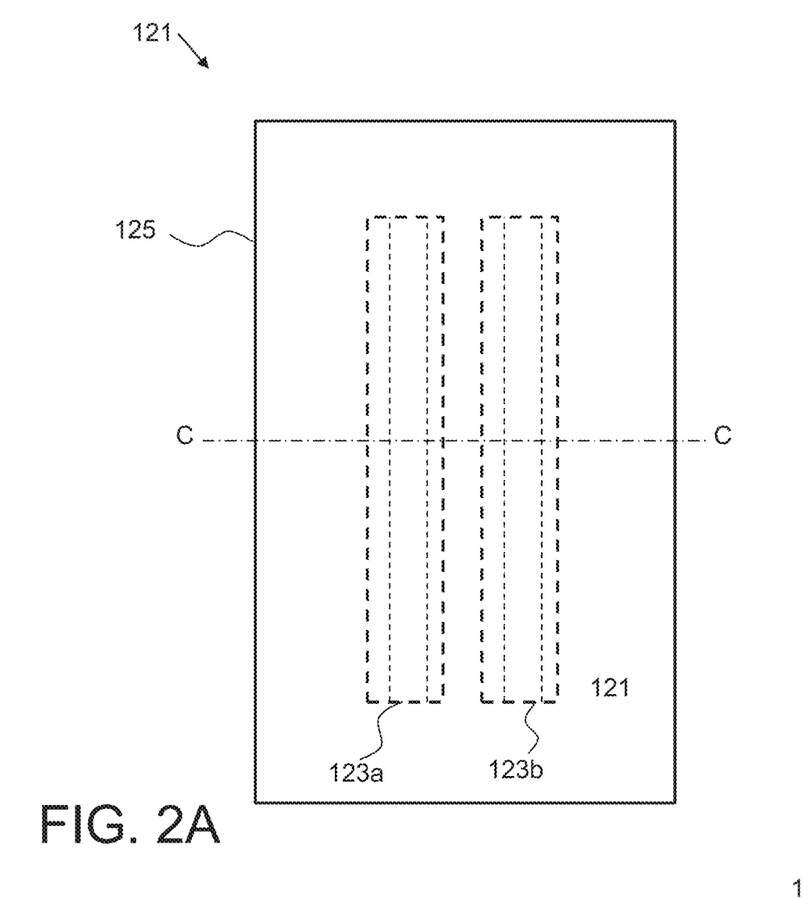
FIGS. 2A-B schematically illustrates an example of an illumination unit for illumination of and into a first portion of a drinking straw.
Figure 2B:
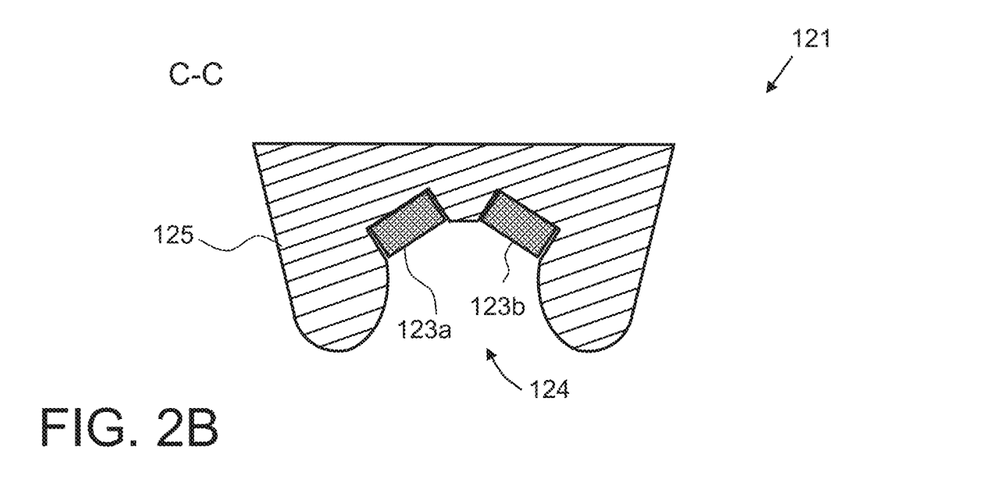

FIGS. 2A-B schematically illustrates an example of an illumination unit 121 for illumination of and into a first portion of a drinking straw, e.g. the drinking straw 101, according to some embodiments herein. Although an illumination unit of the shown type may be preferred in some situations, it will be realized from examples and comments that follow further down, that what is shown in these figures is a specific example and that embodiments herein are not limited to only the shown example.

FIG. 2A shows a top view of the illumination unit 121 and FIG. 2B is a cross-section of the illumination unit 121 at a location C-C marked in FIG. 2A.

The illumination unit 121 has a main body that act as light shield 125 and to which it is attached light sources 123a, 123b, e.g. LEDs, for illumination of a first portion of the drinking straw 101 or wrapped drinking straw 109. In the example, the light sources 123a-b are integrated with the light shield 125. Alternatively a corresponding function as described herein in relation to the illumination unit 121 can be accomplished by means of separate light shield(s) and light source(s).

As can be seen in the figure, the light sources 123a-b are arranged in a recess 124 formed by the light shield 125. The recess 124 is for least partially receiving the first portion of the drinking straw 101 so that the drinking straw perimeter is at last partly enclosed by the recess 124 and light emitting surfaces of the light sources 123a-b become positioned close to the sidewall 102 and outer surface of the drinking straw 101, in some embodiments even in direct contact with the drinking straw 101 or wrapped drinking straw 109, although some distance may be preferred in some situations to reduce heat transfer.

The light shield 125 is in the example configured to shield light both along the drinking straw and in the transversal, i.e. lateral, direction. The former is in the example accomplished by that the light sources 123a-b and the recess 124 do not extend fully from one end to the other of the light shield 125. The light shield 125 may where the recess 124 has ended in the directions along the drinking straw provide a light seal against the wrapped drinking straw 109 and in the lateral direction it may provide a light seal against the wrapped drinking straw 109 and/or the wrapping 107.

The illumination unit 121 and how it can be used and operated for use with, and in accordance with, some embodiments herein will be described next.

Figure 3A:
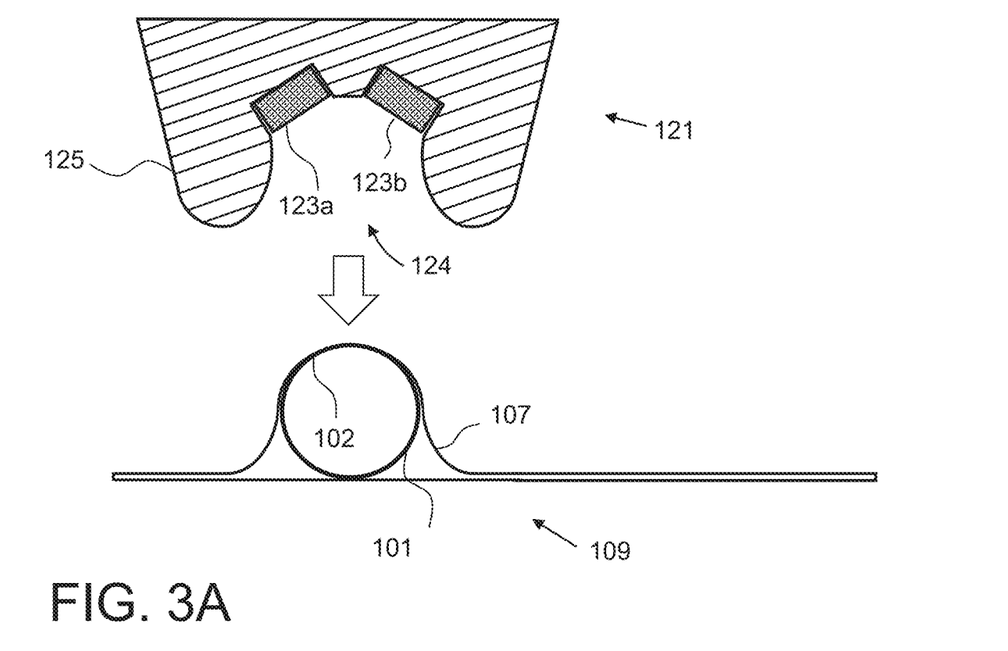
FIGS. 3A-C schematically illustrates how the illumination unit can be moved to position, and when it is in the position, provide illumination of the first portion of the drinking straw.
Figure 3B:
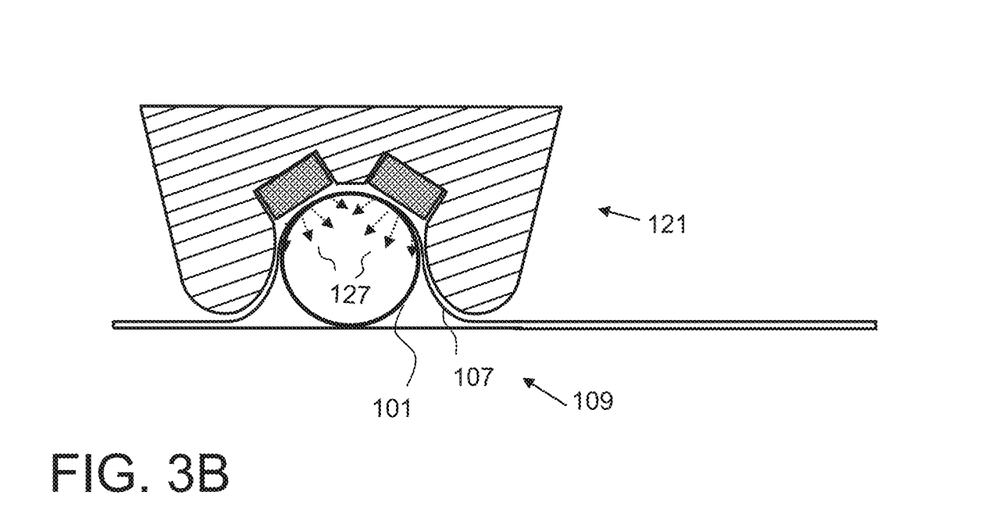
Figure 3C:
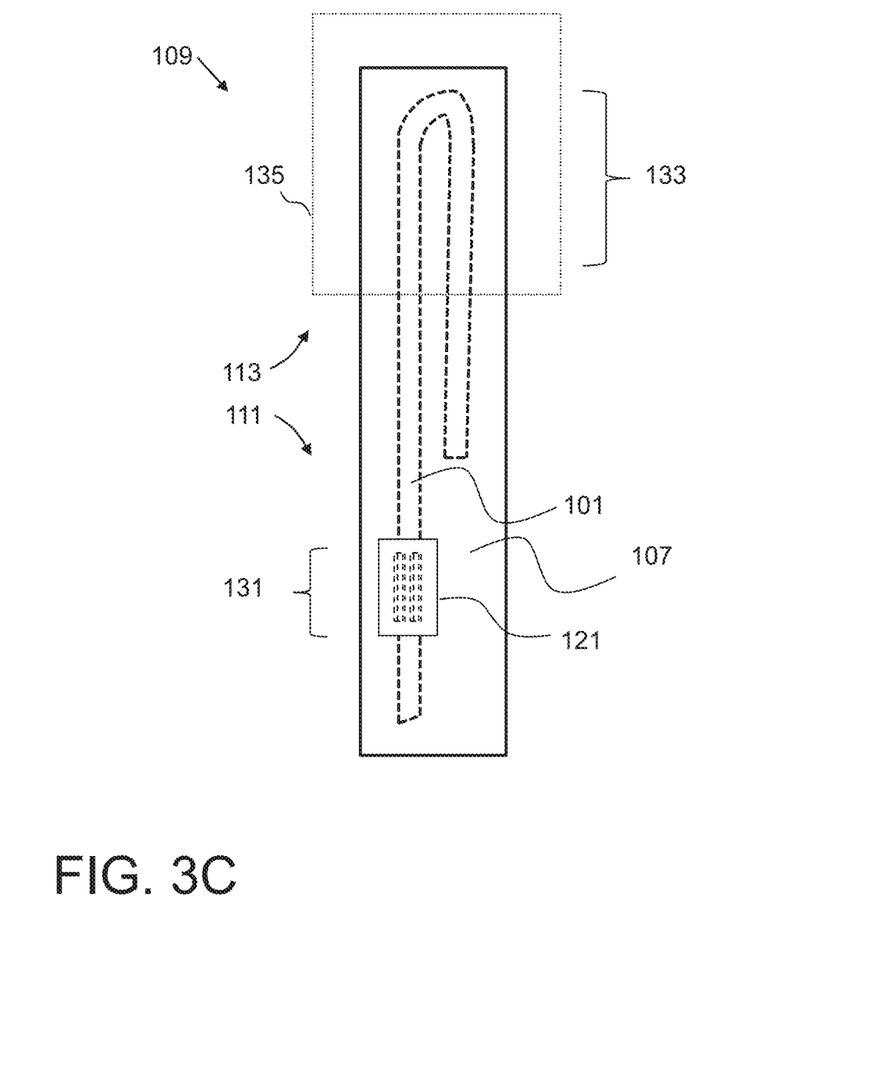

FIGS. 3A-C schematically illustrates how the illumination unit 121 may be moved to a position, and when it is in the position, illuminate a first portion 131 of the wrapped drinking straw 109.

FIGS. 3A-B schematically illustrates how the illumination unit 121 can be moved and positioned to receive, and when it has received, the wrapped drinking straw 109. If it is assumed the wrapped drinking straw 109 is placed on a horizontal surface, the illumination unit 121 may be moved from above towards the horizontal surface until the first portion of the drinking straw 101 is received in the recess 124. The recess 124 may be formed, and the illumination unit 121 be moved, so that when the light shield 125 contacts the wrapping 107 on the side of the drinking straw 101, towards the horizontal surface, the drinking straw part of the wrapped drinking straw 109 has been received and positioned in a suitable way in the recess 124. The result may be that the light sources 123 then are positioned at a predetermined and suitable distance from the sidewall 102 of the drinking straw 125 in order to efficiently illuminate the first portion 131 of the drinking straw 121 with light 127. The illumination is advantageously provided only when the drinking straw 101 is positioned in the recess and the light sources 123a-b and the light shield 125 are at desired positions. The illumination may also be synced with imaging of a second portion 133 of the drinking straw 101 so that the illumination is provided only during the imaging. This means that the illumination can be provided a very short time and can be switched off for longer periods, e.g. when the illumination unit 121 is moved from one drinking straw to another. This way heat generation can easily be kept low and at levels that a drinking straw and wrapping have no problem to handle.

During illumination the distance between the light sources 123a-b, in particular the light emitting surface thereof, and the sidewall 102 may be in magnitude of a millimeter(s) or less. Since it is advantageous to position the light source(s) close to the sidewall 102 to increase illumination on and into the drinking straw 101, light source(s) should preferable not be positioned farther away than a distance corresponding to the diameter or radius of the drinking straw, although closer is preferred when possible. The light emitting surface may be in physical contact with the outer surface of the sidewall 102, or the wrapping 107 when such is present, to increase the light being transmitted into the drinking straw, but it may nevertheless be preferred to avoid this to reduce the risk of thereby damaging the drinking straw or the wrapping.

As seen in the figure, the light sources 123a-b are arranged in the recess 124 with light emitting surfaces of the light sources facing the sidewall 102 of the drinking straw 101 at two or more different angles to thereby increase surface illumination onto and into the drinking straw 101. In the example the light emitting surfaces are on two opposite sides of the drinking straw 101.

In some embodiments there is instead a single light emitting surface, e.g. formed by one or more LEDs and that may be flat and arranged directly above the wrapped drinking straw 109 and/or parallel with the horizontal surface that the wrapped drinking straw 109 may rest on.

In some of embodiments with two light emitting surfaces at two different angles and at opposite sides of the drinking straw, there is also a third light emitting surface arranged at yet another angle between said two surfaces, e.g. directly above the wrapped drinking straw 109 and/or parallel with the horizontal surface that the wrapped drinking straw 109 may rest on.

An alternative to multiple light emitting surfaces that are flat, may be one or more light emitting surfaces that are curved and formed to cover and fit the outside contour of the dinking straw side wall 102. Such LEDs can be provided but it may be more cost efficient to use standard LEDs with flat light emitting surfaces as shown in the example. Each light source, e.g. each one of light sources 123*a-b*, may be a single LED with a very large light emitting surface and/or non-conventional form factor, but such may need special manufacturing. I may be advantageous to instead use multiple conventional LEDs arranged side by side with parallel light emitting surfaces forming a common light emitting surface.

The type of light for the illumination may be visible or near visible light. Typically any such light will work, but depending on material and surfaces properties of a specific drinking straw and/or wrapping, some types of light may work better than other. Of course, also sensitivity of the image sensor used should be taken into account so that the image sensor is sufficiently sensitive for the light being used. The skilled person is able to find out from routine experimentation and testing which type of light and image sensor may work best for a specific drinking straw and wrapping.

A part of the illumination unit 121 may be configured to be in contact with the drinking straw 101 or its wrapping 107 during illumination. In the shown example and advantageously this part is the light shield 125. Such part, e.g. the light shield 125, may advantageously be of a soft material that is easily compressed by pressing force and then revert to the original form, e.g. sponge or foam like material, and/or should be without any hard and/or sharp edges that may risk to destructively come in contact with the drinking straw 101 or the wrapping 107 when such is present. Simply to avoid the risk of physical contact that can cause damages to the drinking straw 101 and wrapping 107 when such is present. Such material may also make the light shield 125 more efficient with improved light sealing effect against the drinking straw 101 and/or wrapping 107. Reasons for physically contacting the wrapping 107 and/or drinking straw 101 during the illumination may be one or more of the following: To improve the light shielding effect, to facilitate more light to enter the drinking straw 101, to ensure a desired, e.g. predetermined, position for the light source(s) 123*a-b* and/or light shield 125 in relation to the drinking straw 101 and/or wrapping 107, to move or press the wrapping towards and/or against the drinking straw 101 to facilitate light transfer through the wrapping 107 into the drinking straw 101.

FIG. 3C shows a top view of the wrapped drinking straw 109 when the illumination unit 121 is in position for illumination of the first position 131 of the drinking straw 101 in the wrapping 107, i.e. the wrapped drinking straw 109. The light that enters into the drinking straw 101 where the light sources 123*a-b* of the illumination unit 121 covers the first portion 131, i.e. part of the light transmitted through the wrapping 107 and sidewall 102 of the drinking straw 101, is thus then guided inside and along the drinking straw 101.

When the illumination is provided and light is guided inside the drinking straw 101, an image is taken of another, second, portion 133 of the drinking straw 101, which is the portion of the drinking straw 101 to be inspected. The image may be provided by means of a camera with image sensor having a a field of view covering at least said second portion 133, e.g. so that an image is provided that corresponds to an imaged area 135 as indicated in the figure, here covering the curved part of the drinking straw 101. The imaged area 135 and image provided shall thus image at least the second portion 133.

Note that the first portion of course may be at another location than the first position 131 shown in FIG. 3C and/or be a larger portion of the total length of the drinking straw, or may be a smaller portion. A larger portion means that more light can be transmitted into the drinking straw but also that a larger portion at the same time is excluded for the second portion and inspection while the illumination is provided. The second portion may of course be another portion of the drinking straw 101 than the second portion 133 shown in the figure. To inspect an entire drinking straw, embodiments herein may be applied to the same drinking straw consecutively but with different first and second positions, i.e. a change between applications.

Figure 4:
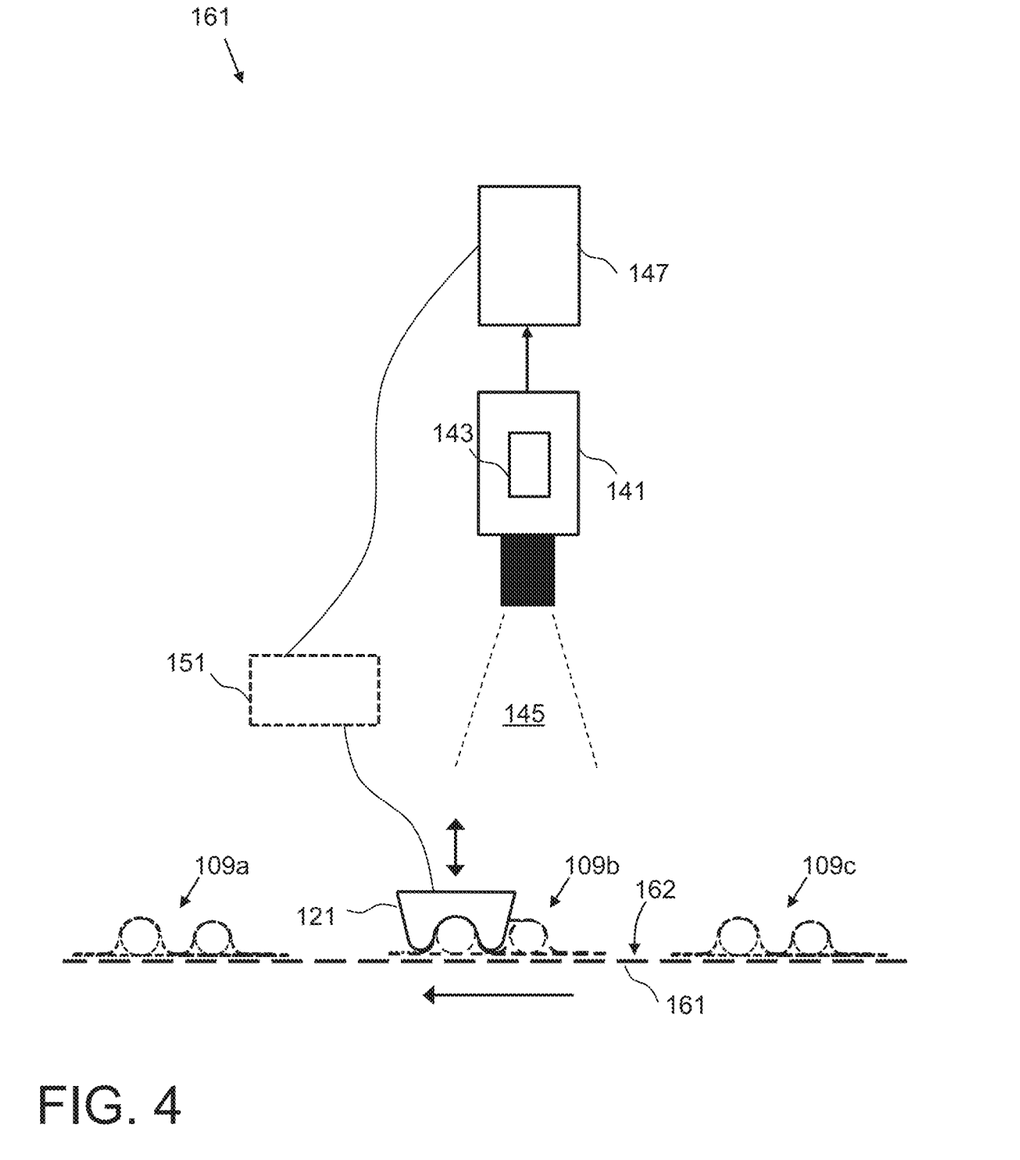
FIG. 4 schematically illustrates an imaging system for inspection of drinking straws and wrapped drinking straws according to some embodiments herein.

FIG. 4 schematically illustrates an imaging system 101 for inspection of drinking straws and wrapped drinking straws, such as the drinking straw 101 and the wrapped drinking straw 109, based on the above and according to some embodiments herein. A camera 141 with image sensor 143 is arranged to have a field of view 145 so it can provide digital images of a second portion, such as the second portion 133, of a drinking straw or wrapped drinking straw, while a first portion, such as the first portion 131, thereof is illuminated as described above, i.e. so that some light enters the drinking straw via a sidewall and is reflected inside and along the drinking straw. More particularly, the digital image may correspond to the imaged area 135 and may result from exposure of the image sensor 143 when the illumination unit 121, as shown in the figure, illuminates a first portion of a drinking straw 109*b* through wrapping and sidewall so that light enters the inside of the drinking straw 109*b*.

The imaging system 161 may be configured to work with drinking straws, and/or wrapped drinking straws, on a horizontal surface 162, e.g. a conveyor belt or similar that may transport drinking straws and/or wrapped drinking straws 109*a-c*, for example in connection with manufacturing thereof. The drinking straws may one at a time pass the illumination unit 121 and camera 141 whereby the illumination unit 121 can, e.g. by being moved to an illumination position in relation to the drinking straw 109*b*, provide the illumination to the first portion of the drinking straw 109*b*. The camera 141 may during the illumination image a second portion of the drinking straw 109*b* as described above. The illumination and imaging may be provided very fast. The illumination unit 121 and possibly also the camera 147 may move with each drinking straw for a short while, e.g. if the there is a continuous flow of drinking straws passing by without stopping. Another possibility is to stop the flow of drinking straws temporarily and shortly when the illumination unit is moved in position and/or when it provides the illumination and the imaging is performed, and e.g. until the illumination unit 121 has been moved away to wait for the next drinking straw to be illuminated etc.

The one or more images taken of each second portion of the drinking straws 109*a-c* may be desirable to transfer, e.g. transmit, for further processing, including for example image analyzing, outside the camera 141, such as to a computing device 147 that may be a computer or similar. Such further processing may additionally or alternatively be performed by a separate computing unit or device (not shown), i.e. separate from the image processor 131, but comprised in, e.g. integrated with, the camera 141, or a unit comprising the camera 141.

Suitable drive and/or control circuitry of the light sources 123 and powering thereof were not shown in FIGS. 2A-D. Such may be of conventional type for the light source(s) in use and fully or partly integrated with the illumination unit 121, e.g. with the light sources 123*a-b*, and/or the light 125 shield, or may at least partly be provided by a separate unit connected via one or more cables to the illumination unit 121. For example an externa unit 151 as shown in FIG. 4. The external unit 151 may be connected to the computing device 147, or is one and the same unit or device in some embodiments. The computing device 147 may control both the camera and the illumination unit 121, e.g. via the external unit 151, or the external unit 151 may control both the illumination unit 121 and the computing device 147, or there may e.g. be a third unit or device (not shown) that may provide control of both the camera 141 and the illumination unit 121.

The light sources, e.g, the light sources 123*a-b*, may be configured and be controllable to be either on or off, where on is for providing said illumination on the sidewall, i.e. outer surface, of the drinking straw.

Figure 5A:
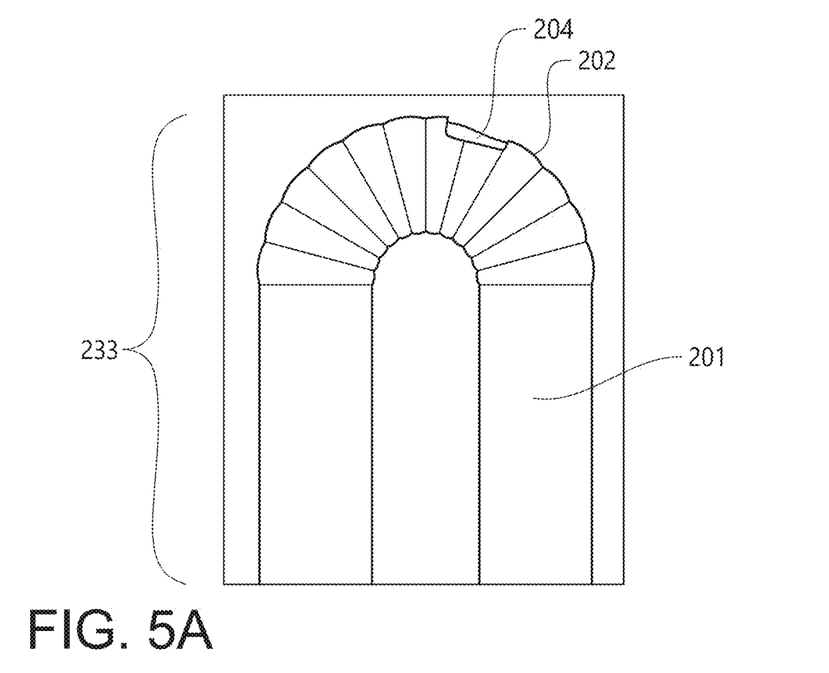
FIGS. 5A-B are a normal image of a second portion of a drinking straw and an image provided based on embodiments herein of the same second portion when the drinking straw is in a wrapping.
Figure 5B:
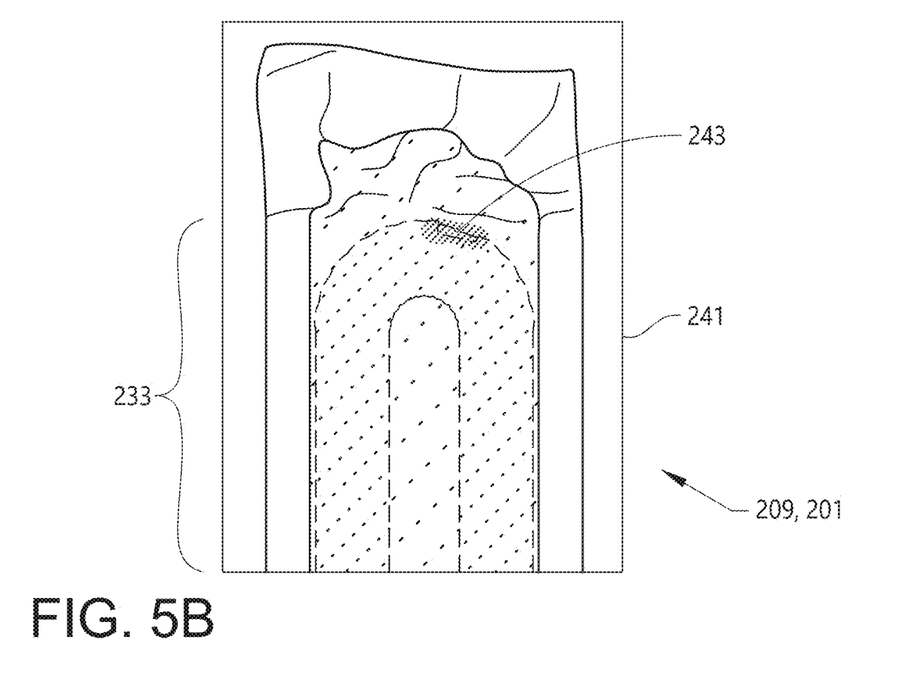

FIGS. 5A-B are a normal image of a second portion 233 of a drinking straw 201 and an image provided based on embodiments herein of the same second portion when the drinking straw 201 is inside a wrapping. FIG. 5A more specifically shows the second portion of the drinking straw 201 with a sidewall 202 that has a damage that here is a hole 204 in the sidewall. The second portion 233 covers, and the hole 204 is in, a curved or bent part of the drinking straw 201.

FIG. 5B shows a digital image 241 of the same second portion 233 when the drinking straw 201 is inside the wrapping, i.e. the image is of a wrapped drinking straw 209, and the image has been provided based on embodiments herein. That is, illumination has been provided through the wrapping and the sidewall of a first portion (not shown) of the drinking straw 201 so that some light has entered the inside of the drinking straw and is guided therein by internal reflections in the drinking straw 210 to the second portion 233, as described above. In the shown example, some of the guided light leaks out rather evenly through the sidewall of the drinking straw 209 and the through the wrapping, as can be seen in the image 241, and is the reason both the wrapping and drinking straw are visible in the image. At the location of the hole 204 it can be seen a local spot 243 of increased light intensity resulting from discrepant light escape out from the drinking straw 201 via the hole 204. The local spot 242 is thus indicative of presence of the hole 204 and thus of a damage to the drinking straw 201. More generally, a light pattern captured by such digital image can be analyzed to inspect the second portion of the drinking straw 209. The light pattern corresponds to light escape of the internally reflected light out from the drinking straw via a sidewall of the drinking straw 201 at the second portion 233, i.e. a portion corresponding to the second portion 133 used in the examples above.

When the analyzing of a light pattern in an image, such as the digital image 241, is made in order to detect a damage, if any, in a drinking straw, this analyzing may be about detecting a local spot, e.g. the local sport 243, of image data discrepancy in the digital image. The image data discrepancy thus corresponding to capture of discrepant light escape from the drinking straw via said damage, whereby the damage can be detected.

The discrepant light escape thus being caused by the damage, e.g. a hole, such as the hole 204. The discrepancy shall thus be understood to be relative to a desired and typically normal situation without any damage. A damage may e.g. be a breakage or near breakage in the surface of the straw, that can correspond to or be close to cause a hole in the straw, and thereby cause more light to escape therefrom than normally without the damage, which can be detected by intensity variation, e.g. increase of local intensity, such as in the case of the local sport 243.

In some embodiments, not illustrated in figures, said light pattern to be analyzed is resulting from light escape via a normally occurring structure in the drinking straw, e.g. a joint or seam from forming of the drinking straw. In these embodiments, the analyzing can be about evaluation, e.g. part of quality control, of said structure and the drinking straw, such as finding out about the strength or quality of the joint. The amount of light escape, e.g. corresponding to an increase and/or abnormal light variation of normal light intensity in said digital images at location(s) of said structure can be used as indicator of strength and/or quality of the structure, e.g. joint, and thereby also of the drinking straw. Alternatively or additionally, the analyzing can be used to assure that the wrapped drinking straw has a light pattern that is sufficiently similar to a preferred light pattern that may correspond to a drinking straw and/or wrapped drinking straw of sufficient quality, whereby any wrapped drinking straw, e.g. during manufacturing, not fulfilling this can be excluded from being used.

Figure 6:
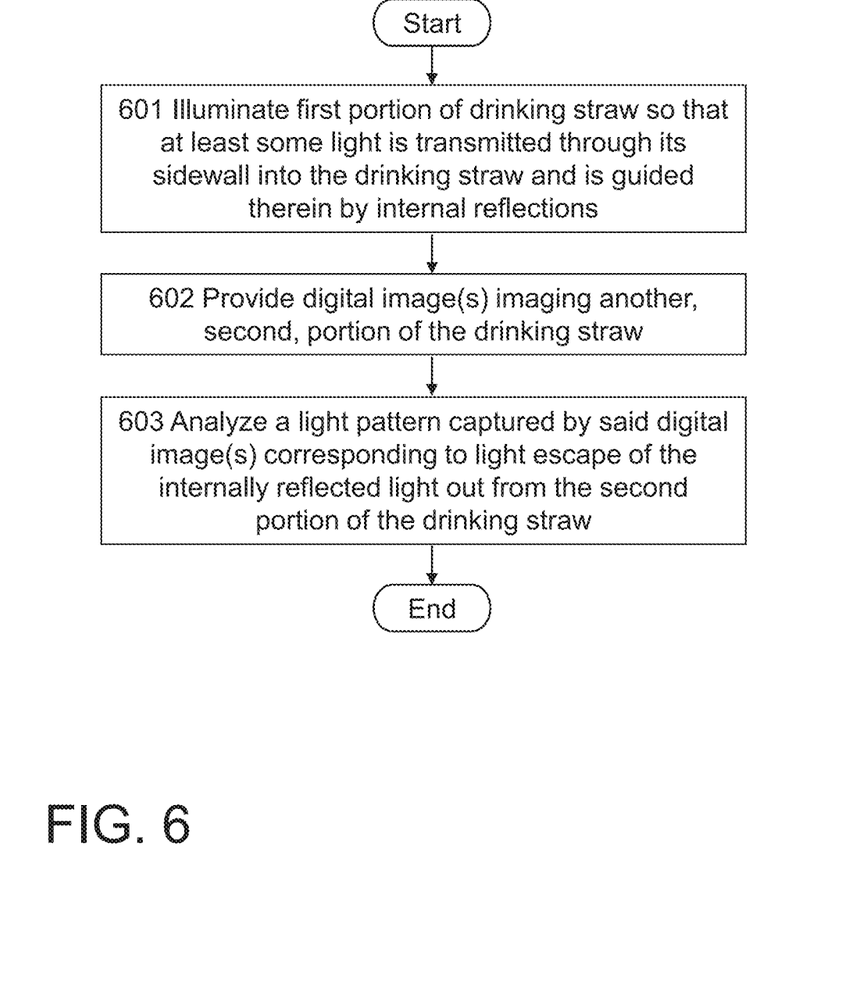
FIG. 6 is a flowchart for schematically illustrating embodiments of a method according to embodiments herein

FIG. 6 is a flowchart for schematically illustrating embodiments of a method based on the above and according to embodiments herein. The actions below, which may form the method, are for inspection of a drinking straw, e.g. the drinking straw 101 or 201. The drinking straw 101 will be used as example in the following.

The method and/or actions below and indicated in FIG. 6 may be performed by device(s), i.e. one or more devices, e.g. fully or partly corresponding to the imaging system 161, such as the computing device 147 and/or the camera 141 and/or the illumination unit 121 and/or the external unit 151, and/or other suitable device(s). Device(s) for performing the method and actions thereof are further described below.

Note that the actions below may be taken in any suitable order and/or be carried out fully or partly overlapping in time when this is possible and suitable.

Action 601

It is, by means of one or more light sources, e.g. the light sources 123*a-b*, illuminated a first portion, e.g. the first portion 131, of the drinking straw 101. This is done so that at least some of the light, e.g. the light 127, illuminated on the first portion 131 is transmitted through a sidewall, e.g. the sidewall 102 or 202, of the drinking straw into the drinking straw, and is guided therein by internal reflections. That is, is guided inside and along the drinking straw.

In some embodiments, said one or more light sources, at least during the illumination of the first portion, have one or more light emitting surfaces at a predetermined distance to the drinking straw for specifically accomplishing the illumination of said first portion. In embodiments where the drinking straw is a wrapped drinking straw, e.g. the wrapped drinking straw 109 or 209, the illumination is on and through the wrapping where the first portion is located underlying the wrapping.

In some embodiments, said one or more light sources have a light emitting surface for physically covering, at least during said illumination, said sidewall of the drinking straw where said first portion of the drinking straw is located, i.e. covering the sidewall outer surface where the light is to enter into the drinking straw.

Action 602

It is provided, by means of a camera, e.g. the camera 143, with image sensor, e.g. the image sensor 143, configured to sense light provided by said light sources, one or more digital images, such as the digital image 241, imaging another, second, portion, e.g. the second portion 133 or 233, of the drinking straw during said illumination, i.e. the illumination in Action 601.

The second portion should thus correspond to or comprise the part or portion of the drinking straw to be inspected, i.e. where inspection is desired and/or shall be performed. As already indicated, the second portion, or at least the part or portion for inspection, should be outside, i.e. be non-overlapping with, the first portion, e.g. 131, where the illumination to enter the drinking straw is provided in Action 601. Typically they shall be at different and non-overlapping longitudinal locations, i.e. at different places along the drinking straw. In principle the second portion can be the rest of the drinking straw that is not the first portion, or vice versa.

In case of an elliptical or circular drinking straw, as in the shown examples herein, there is only one circumferential sidewall and the first and second portion are in, i.e. are different portions of, the same sidewall. However, in the unusual but possible case of a drinking straw with more than one sidewall, the first portion and the second portion may be in different sidewalls of the drinking straw. In any case, the first and second portions may be on different lateral sides of the drinking straw although they, of course, alternatively or additionally may be on the same lateral side. One or both of the first and second portions may cover all lateral sides, i.e. may be circumferential, although this is typically not needed and/or may not always be practically possible or desirable.

To the extent it is practically possible and needed, the first portion, where illumination is provided, may cover as much of the drinking straw as possible outside the second portion. In principle, the more sidewall covered by the first portion, the more illumination can be made to enter the drinking straw.

In a practical situation with insufficient light that is transmitted to the inside of the drinking straw and guided to the second portion, the first portion may be extended and/or moved to other location along the drinking straw when attempting to improve the situation. Of course, alternatively or additionally to attempt to improve the situation the light intensity may be increased and/or the type of the light used for the illumination be changed.

In some embodiments, one or more further portions, e.g. a third portion, with the same function for illumination into the drinking straw as the first portion, are introduced. Such one or more separate portions may be for practical reasons and/or due to that the second portion is "in the way" for extension of the first portion.

For example, with reference to the example of FIG. 3C, the illumination unit 121 may be moved, e.g. closer to the second portion 133, and/or be extended longitudinally and thereby also extend the first portion 131 along the drinking straw 101, e.g. up to the second portion 133. Additionally and/or alternatively, yet another illumination unit and a third portion may be introduced with the same function as the illumination unit 121 and the first portion 131, but located along the drinking straw 101 at the drinking end instead, i.e. after the curved part of the drinking straw 101 so that the second portion 133 is located between the first portion 131 and the third portion.

Action 603

It is analyzed a light pattern captured by said one or more digital images, said light pattern corresponding to light escape of the internally reflected light out from the second portion of the drinking straw 101 via a sidewall, e.g. the sidewall 101, of the drinking straw 101.

In some embodiments, the inspection is a damage inspection and said light escape is via a damage, e.g. the hole 204, in said sidewall of the drinking straw. In some of these embodiments, the analyzing comprises to detect said damage in the drinking straw as a local spot, e.g. the local spot 243, of image data discrepancy in at least one of said digital images. The local spot may thus correspond to and/or be result from the damage. The image data discrepancy corresponding to capture of discrepant light escape from the drinking straw via said damage, such as discussed above.

In embodiments where the drinking straw is a wrapped drinking straw, e.g. the wrapped drinking straw 109 or 209, the light escape of interest should thus be at a location in the image corresponding to where the drinking straw is located.

In some embodiments, a light shield, e.g. the light shield 125, is applied to prevent light from the light sources to, at least during said imaging of the second portion, directly illuminate the second portion. This light shield, or another, may additionally prevent or reduce illumination from the light sources to directly illuminate the image sensor, e.g. the image sensor 131.

In some embodiments, a light shield, e.g. the light shield 125, is applied to reduce reflected light from the first portion to, at least during said imaging of the second portion, illuminate the second portion.

Note that the light shield in these embodiments may be the same as in the embodiments above to prevent the direct illumination of the second portion, but may additionally or alternatively be fully or partly separated and/or different light shields.

In some embodiments, the light sources and said light shield are positioned between the camera and the drinking straw but so that the camera still can image at least the second portion, while at the same time the first portion may be shielded by the light shield.

In some embodiments, the drinking straw is inside a wrapping, e.g. the wrapping 107 and thereby is a wrapped drinking straw, such as the wrapped drinking straw 109 or 209. In these embodiment, said at least some of the light, e.g. the light 127, is transmitted through both the wrapping and the sidewall of the drinking straw into the drinking straw. Further, in these embodiments, said imaging is of the wrapped drinking straw and said light pattern corresponds to said light escape visible through the wrapping. The light escape visible through the wrapping should be from where the drinking straw is located underlying the wrapping. The drinking straw may in the image be visible though the wrapping or its location may be known in relation to some reference in the image or be predetermined.

As used herein, the wrapping is for containing and/or protecting the drinking straw before it is used for drinking, e.g. during transport, and/or for attaching the drinking straw to a dispenser it is to be used with. The drinking straw is intended to be fully or partly removed from the wrapping before it is used.

In some embodiments, said one or more light sources are integrated with the light shield in a light emitting unit, e.g. the light emitting unit 121. In some of these embodiment, said light emitting unit, at least during illumination of the first portion, is positioned in physical contact with the wrapping so that the wrapping is pressed against said sidewall of the drinking straw and said one or more light sources become positioned at a predetermined distance from the drinking straw underlying the wrapping. This enables transmission of more light into the drinking straw.

In some of these embodiments, said one or more light sources are arranged in a recess, e.g. the recess 124, formed by the light shield, for at least partially receiving the drinking straw covered by and underlying the wrapping. Said one or more light sources may be arranged in the recess with light emitting surfaces of the light sources facing said sidewall of the drinking straw. Said light emitting surfaces of the light sources may advantageously face the sidewall of the drinking straw at two or more different angles to thereby increase surface illumination onto and into the drinking straw. The differently angled light emitting surfaces may be at opposite sides of the drinking straw.

Above, the first portion may be part of an insertion end portion, e.g. the insertion end portion 103, of the drinking straw for insertion into a dispenser. The second portion may be part of or correspond to a curved and/or bent drinking end portion, e.g. the curved drinking end portion 105, of the drinking straw.

Figure 7:
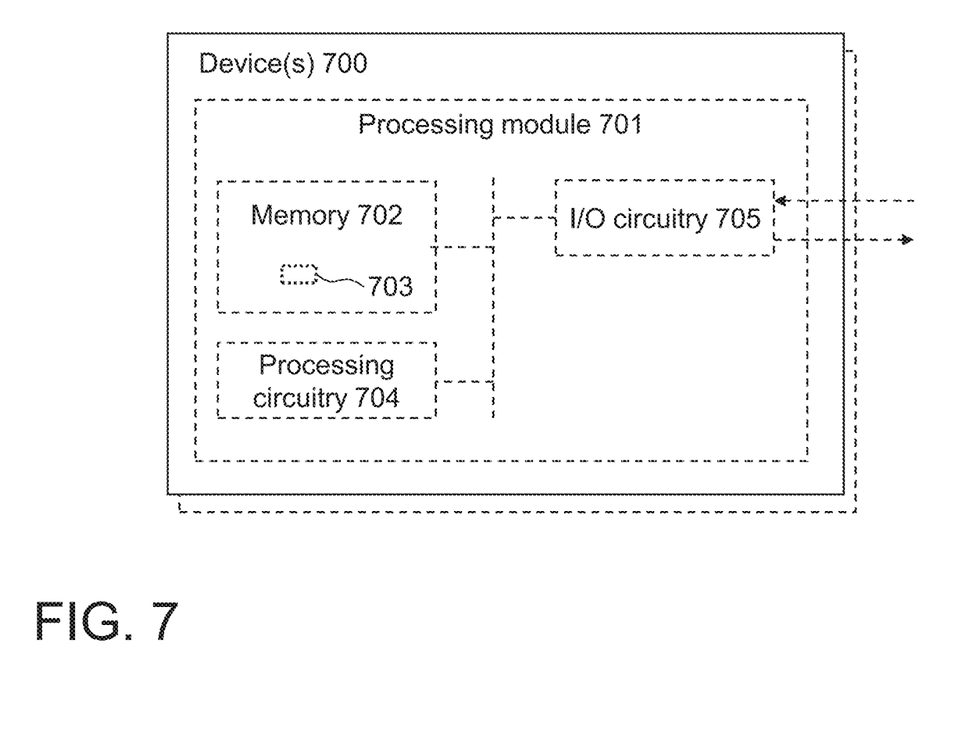
FIG. 7 is a schematic block diagram for illustrating embodiments of how one or more devices may be configured to perform the method and actions discussed in relation to FIG. 6.

FIG. 7 is a schematic block diagram for illustrating embodiments of one or more devices 700, i.e. device(s) 700, that may correspond to devices(s) already mention in the above for performing embodiments herein, such as for performing the method and/or actions described above in relation to FIG. 6. The device(s) may e.g. fully or partly correspond to the imaging system 161, such as the computing device 147 and/or the camera 141 and/or the illumination unit 121 and/or the external unit 151, and/or other suitable device(s).

The schematic block diagram is for illustrating embodiments regarding how the device(s) 700 may be configured to perform the method and actions discussed above in relation to FIG. 6. Hence, the device(s) 700 is for inspection of a drinking straw, e.g. the drinking straw 101 or 201.

The device(s) 700 may comprise a respective processing module 701, such as processing means, one or more hardware modules, including e.g. one or more processing circuits, circuitry, such as processors, and/or one or more software modules for performing said method and/or actions.

The device(s) 700 may further comprise a respective memory 702 that may comprise, such as contain or store a respective computer program 703. The computer program 703 comprises 'instructions' or 'code' directly or indirectly executable by the device(s) 700 to perform said method and/or actions. The memory 702 may comprise one or more memory units and may further be arranged to store data, such as configurations, data and/or values, involved in or for performing functions and actions of embodiments herein.

Moreover, the device(s) 700 may comprise respective processing circuitry 704 involved in processing and e.g. encoding data, as exemplifying hardware module(s) and may comprise or correspond to one or more processors or processing circuits. The processing module(s) 701 may comprise, e.g. 'be embodied in the form of' or 'realized by' the processing circuitry 704. In these embodiments, the memory 702 may comprise the computer program 703 executable by the processing circuitry 704, whereby the device(s) 700 is operative, or configured, to perform said method and/or actions thereof.

Typically the device(s) 700, e.g. the processing module(s) 901, comprises a respective Input/Output (I/O) module(s) 705, configured to be involved in, e.g. by performing, any communication to and/or from other units and/or devices, such as sending and/or receiving information to and/or from other devices. The I/O module(s) 705 may be exemplified by obtaining, e.g. receiving, module(s) and/or providing, e.g. sending, module(s), when applicable.

Further, in some embodiments, the device(s) 700, e.g. the processing module(s) 701, comprises one or more of illumination module(s), providing and/or imaging module(s), analysing modules(s), as exemplifying hardware and/or software module(s) for carrying out actions of embodiments herein. These modules may be fully or partly implemented by the processing circuitry 704.

Hence:

The device(s) 700, and/or the processing module(s) 701, and/or the processing circuitry 704, and/or the I/O module(s) 705, and/or the illumination module(s) may be operative, or configured, to, illuminate, by means of said one or more light sources, said first portion of the drinking straw so that said at least some of the light illuminated on the first portion is transmitted through said sidewall of the drinking straw into the drinking straw, and is guided therein by internal reflections.

The device(s) 700, and/or the processing module(s) 701, and/or the processing circuitry 704, and/or the provision and/or imaging module(s) may be operative, or configured, to provide, by means of said camera with the image sensor configured to sense light provided by said light sources, said one or more digital images imaging said another, second, portion of the drinking straw during said illumination.

Further, the device(s) 700, and/or the processing module(s) 701, and/or the processing circuitry 704, and/or the analysing module(s) may be operative, or configured, to analyse said light pattern captured by said one or more digital images.

Figure 8:
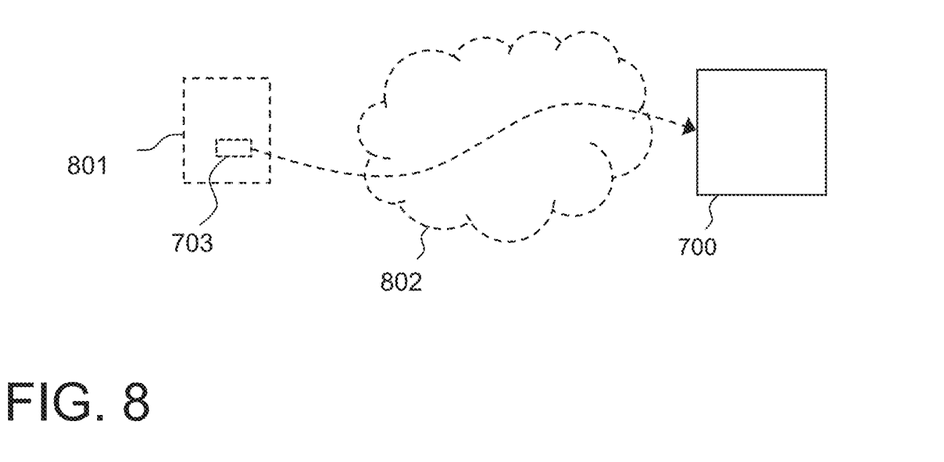
FIG. 8 is a schematic drawing illustrating some embodiments relating to computer program and carriers thereof to cause device(s) to perform the method and actions discussed in relation to FIG. 6.

FIG. 8 is a schematic drawing illustrating some embodiments relating to computer program(s) and carriers thereof to cause said device(s) 700 discussed above to perform said method and actions.

The respective computer program may be the respective computer program 703 and comprises instructions that when executed by the processing circuitry 704 and/or the processing module(s) 701, cause the device(s) 700 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 801 as schematically illustrated in the figure. The computer program 703 may thus be stored on the computer readable storage medium 801. By carrier may be excluded a transitory, propagating signal and the data carrier may correspondingly be named non-transitory data carrier. Non-limiting examples of the data carrier being a computer readable storage medium is a memory card or a memory stick, a disc storage medium or a mass storage device that may be based on hard drive(s) or Solid State Drive(s) (SSD). The computer readable storage medium 801 may be used for storing data accessible over a computer network 802, e.g. the Internet or a Local Area Network (LAN). The computer program 703 may furthermore be provided as pure computer program(s) or comprised in a file or files. The file or files may be stored on the computer readable storage medium 801 and e.g. available through download e.g. over the computer network 802 as indicated in the figure, e.g. via a server. The server may e.g. be a web or File Transfer Protocol (FTP) server. The file or files may e.g. be executable files for direct or indirect download to and execution on said device(s) to make it perform as described above, e.g. by execution by the processing circuitry 704. The file or files may also or alternatively be for intermediate download and compilation involving the same or another processor(s) to make them executable before further download and execution causing said device(s) 700 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically but not necessarily drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

We claim:

1. Method for inspection of a drinking straw, wherein the method comprises:

illuminating, by one or more light sources, a first portion of the drinking straw so that at least some of the light on the first portion is transmitted through a sidewall of the drinking straw into the drinking straw, and is guided therein by internal reflections;

providing, by a camera with image sensor configured to sense light provided by said light sources, one or more digital images imaging another, second, portion of the drinking straw during said illumination; and analyzing a light pattern captured by said one or more digital images, said light pattern corresponding to light escape of the internally reflected light out from the second portion of the drinking straw via a sidewall of the drinking straw.

2. The method as claimed in claim 1, wherein the inspection is a damage inspection and said light escape is via a damage in said sidewall of the drinking straw.

3. The method as claimed in claim 2, wherein the analyzing comprises to detect said damage in the drinking straw as a local spot of image data discrepancy in at least one of said digital images, said image data discrepancy corresponding to capture of discrepant light escape from the drinking straw via said damage.

4. The method as claimed in claim 1, wherein said one or more light sources at least during the illumination of the first portion have one or more light emitting surfaces at a predetermined distance to the drinking straw for specifically accomplishing the illumination of said first portion.

5. The method as claimed in claim 1, wherein said one or more light sources have a light emitting surface for physically covering, at least during said illumination, said sidewall of the drinking straw where said first portion of the drinking straw is located.

6. The method as claimed in claim 1, wherein a light shield is applied to prevent light from the light sources to, at least during said imaging of the second portion, directly illuminate the second portion.

7. The method as claimed in claim 1, wherein a light shield is applied to reduce reflected light from the first portion to, at least during said imaging of the second portion, illuminate the second portion.

8. The method as claimed in claim 1, wherein the drinking straw is inside a wrapping and thereby is a wrapped drinking straw, wherein said at least some of the light is transmitted through both the wrapping and the sidewall of the drinking straw into the drinking straw, wherein said imaging is of the wrapped drinking straw, and wherein said light pattern corresponds to said light escape visible through the wrapping.

9. The method as claimed in claim 8, wherein said one or more light sources are integrated with the light shield in a light emitting unit and said light emitting unit, at least during illumination of the first portion, is positioned in physical contact with the wrapping so that the wrapping is pressed against said sidewall of the drinking straw and said one or more light sources become positioned at a predetermined close distance from the underlying drinking straw.

10. The method as claimed in claim 9, wherein the one or more light sources are arranged in a recess, formed by the light shield, for at least partially receiving the drinking straw covered by and underlying the wrapping and wherein said one or more light sources are arranged in the recess with light emitting surfaces of the light sources facing said sidewall of the drinking straw.

11. The method as claimed in claim 10, wherein said light emitting surfaces of the light sources are facing the sidewall of the drinking straw at two or more different angles to thereby increase surface illumination onto and into the drinking straw.

12. A non-transitory computer readable storage medium comprising instructions that when executed by one or more processors causes one or more devices to perform the method according to claim 1.

13. Method for inspection of a sidewall of a drinking straw; based on light leakage of guided light out from the drinking straw, wherein the method comprises:
   guiding light into the drinking straw; and
   inspecting the sidewall based on light leakage of guided light out from the drinking straw via the sidewall.

14. One or more devices for inspection of a drinking straw, wherein said one or more devices are configured to:
   illuminate, by one or more light sources, a first portion of the drinking straw so that at least some of the light on the first portion is transmitted through a sidewall of the drinking straw; into the drinking straw, and is guided therein by internal reflections;
   provide, by a camera with image sensor configured to sense light as of said light sources, one or more digital images imaging another, second, portion of the drinking straw during said illumination; and
   analyze a light pattern captured by said one or more digital images, said light pattern corresponding to light escape of the internally reflected light out from the second portion of the drinking straw via a sidewall of the drinking straw.

\* \* \* \* \*